United States Patent [19]

Raj et al.

[11] 4,445,696
[45] May 1, 1984

[54] NONBURSTING MAGNETIC LIQUID SEALS FOR HIGH VACUUM APPLICATIONS

[75] Inventors: Kuldip Raj, Merrimack; Ronald Moskowitz, Hollis; Raymond Rodier, Nashua, all of N.H.

[73] Assignee: Ferrofluidics Corporation, Nashua, N.H.

[21] Appl. No.: 468,339

[22] Filed: Feb. 22, 1983

[51] Int. Cl.³ .............................................. F16J 15/40
[52] U.S. Cl. ........................................ 277/80; 277/1; 277/135
[58] Field of Search ............... 277/1, 80, 135; 308/10, 308/36.1, 187.1, 187.2

[56] References Cited

U.S. PATENT DOCUMENTS

| | | | |
|---|---|---|---|
| 3,848,879 | 11/1974 | Hudgins | 277/80 |
| 4,357,023 | 11/1982 | Yamamura | 277/80 X |

FOREIGN PATENT DOCUMENTS

| | | | |
|---|---|---|---|
| 54-30347 | 3/1979 | Japan | 277/80 |
| 653470 | 3/1979 | U.S.S.R. | 277/80 |
| 918612 | 4/1982 | U.S.S.R. | 277/80 |

*Primary Examiner*—Robert S. Ward
*Attorney, Agent, or Firm*—Richard P. Crowley

[57] ABSTRACT

A single-stage, ferrofluid magnetic seal apparatus and method which comprises: an annular, permanent-magnet ring element adapted to surround a shaft to be sealed, which shaft extends between first low-pressure and second high-pressure; first and second pole pieces in a magnetic-flux relationship with the permanent magnet, and having one and the other ends, the other end extending into a close, noncontacting relationship with the surface of the shaft, to define a radial gap therebetween; a plurality of stages formed in the radial gap under the other end of the second pole piece, which pole piece is placed toward the high-pressure side the environment, and the radial gap under the first pole piece, placed toward the low-pressure side of the environment, being shallow and generally less than about 2 mils; and ferrofluid in the radial gap under the other end of the second pole piece which forms a plurality of separate O-ring ferrofluid seals of defined pressure capacity, thereby providing a single-stage, ferrofluid magnetic seal apparatus and method, which seal apparatus has a reduced tendency to permit unpredictable air bursts, when installed about the rotary shaft between first and second pressure environments.

14 Claims, 2 Drawing Figures

NONBURSTING MAGNETIC LIQUID SEALS FOR HIGH VACUUM APPLICATIONS

BACKGROUND OF THE INVENTION

Magnetic fluid or ferrofluid magnetic seals have been used both as exclusion seals, where there is no significant pressure difference on either side of the ferrofluid seal, or as multiple-stage seals, wherein a difference in pressure environment is involved between the different sides of the seal. Ferrofluid exclusion seal apparatuses are particularly useful in providing effective seals in computer-disc-drive systems and in other high-performance, precision spindle applications, while multiple-stage seals are particularly employed between a first low- and a second high-pressure environment, such as between a vacuum environment and an atmospheric environment.

Multiple-stage ferrofluid seals, such as described in U.S. Pat. No. 3,620,584, issued Nov. 16, 1971, typically are used to separate different pressure environments, such as a vacuum and an atmospheric pressure, with the pressure capacity of the seal being based on the number of the particular ferrofluid O-ring seal stages used. The multiple stages of the multiple-stage seal are formed through the use of knife or other edges on one or typically both pole pieces, or on the surface of the magnetically permeable shaft element underneath one or the other or typically both pole pieces, with the ferrofluid magnetically retained in a magnetic flux under each of the particular edges in the radial gap. In operation, the multiple-stage seal forms a plurality of separate, ferrofluid O-ring seals, with each O-ring seal defining, in an accumulative manner, a pressure capacity, typically with an air space between each of the multiple-stage seals, as well as an air space, as in the exclusion seal, between the first and second pole pieces beneath the annular permanent magnet.

Multiple-stage seals of U.S. Pat. No. 3,620,584 employ a common permanent-magnet source as a source of magnetic flux for all stages of the seal. However, multiple-stage seals also may be formed by employing a plurality of separate magnets, although in manufacture these seals tend to be much bulkier than wherein a single, common permanent magnet is employed.

It is desirable to provide improved, ferrofluid magnetic pressure-capacity seals, particularly where multiple-stage seals are to be employed in separating different pressure environments, and to provide a ferrofluid multiple-stage seal which has less of a tendency to air bursts; that is, to admit air into the lower-pressure environment and thus to provide a more stable, predictable and safer multiple-stage ferrofluid pressure seal apparatus.

SUMMARY OF THE INVENTION

This invention relates to a ferrofluid seal apparatus and method of use, and in particular the invention concerns a one pole piece ferrofluid seal (henceforth referred to as a single pole piece seal) apparatus and method (the second pole piece is used to complete the magnetic circuit) wherein the seal apparatus has a reduced tendency to permit air bursts, when employed as a ferrofluid seal apparatus about a rotary shaft between different pressure environments.

A single pole piece ferrofluid seal apparatus and method has been discovered for use between a first low-pressure environment, such as a vacuum environment, and a second high-pressure environment, such as an atmospheric or greater environment, and which seal apparatus has a reduced tendency to permit unpredictable air bursts or air spikes to occur during the sealing operation. The seal apparatus of the invention provides for a multiple-stage ferrofluid O-ring seal, of a defined and desired pressure capacity, to be formed between the surface of a shaft to be sealed and the other end of a pole piece, which pole piece is positioned toward the high-pressure environment. The seal apparatus of the invention includes a pole piece positioned toward the low-pressure environment, the other end of the pole piece extending into a close, defined relationship with the surface of the shaft to be sealed, to define a small radial gap, which radial gap is the same or less as the radial gap beneath the pole piece toward the high-pressure environment. Further, the ferrofluid seal apparatus of the invention does not require and is essentially free of any ferrofluid beneath the pole piece toward the low-pressure environment, or in the very shallow gap under the pole piece toward the low-pressure environment, or in the very shallow radial gap under the pole piece, so as to form in effect a single pole piece ferrofluid seal apparatus. While a variety of ferrofluid compositions or magnetic liquids may be employed with the seals of the invention, it is particularly desirable that the seal apparatus employ a low-vapor-pressure-grade ferrofluid, typically with high magnetic saturation and viscosity values, such as, for example, a low-pressure ferrofluid having a viscosity of greater than about 1000 centipoise at 27° C., such as from 1500 to 2500 cps, and a magnetization of greater than about 600 gauss, such as, for example, 600 to 1000 gauss. The high-saturation magnetization of the ferrofluid used with the seal apparatus of the invention enables only a single pole piece of the seal to be employed, to form the multiple-stage seals where necessary, and yet still achieve enough pressure capacity of the seal. Ferrofluid of high viscosity is desirable in reducing the colloidal-particle agglomeration which tends to occur under intense magnetic-field gradients present in the seal apparatus of the invention. Thus, the particular high magnetic saturation and high viscosity-type ferrofluids, along with the seal designs of the invention, provide a nonbursting-type ferrofluid magnetic seal apparatus and method.

The problems associated with air bursts or air bursting in the use of multiple-stage ferrofluid seals and the need to maintain the critically balanced ferrofluid seals, to prevent air bursting or at least to reduce air bursting in seal systems, are described, for example, in U.S. copending application Ser. No 455,065, filed Jan. 5, 1983, now U.S. Pat. No. 4,407,518 (hereby incorporated by reference). Where a ferrofluid multiple-stage seal of high accumulative pressure capacity is used as a seal between different pressure environments, air or gas from the higher-pressure environment tends periodically to burst through the seal stages to contaminate the lower-pressure environment. In pressure-type ferrofluid seals, each stage of the multiple-stage seal has a defined pressure capacity which is balanced within the particular system, to provide an effective pressure seal. However, on the installation of the ferrofluid seal apparatus about the shaft to be sealed, there is usually air entrapped in the system, such as air within the annular air cavity or space beneath the annular permanent magnet and between the pole pieces, as well as air present in the O-ring type gasket materials and the O-ring cavities carrying the O-ring gaskets used to seal the pole pieces and magnet to a nonmagnetic housing, and air also between the annular permanent magnet and the annular pole pieces. Such entrapped air tends to burst and to move toward and be introduced into the low-pressure environment. Such entrapped air often tends to break unexpectedly, quickly and temporarily one or more stages of the ferrofluid seal and to disrupt unpredictably the seal operation and enter into the seal system. Such air bursts are undesirable in being unpredictable in time and tend to admit air bursts very quickly in relatively large amounts; that is, to permit air bursts to occur in milliseconds, with the air burst having a large amplitude. Air bursts are also undesirable in being unpredictable, large in magnitude and occur quickly and tend to disrupt the system.

In present ferrofluid seal apparatuses, typically a plurality of individual O-ring seals are formed about the surface of the rotary shaft which is to be sealed, and which extends into the different pressure environments. The ferrofluid O-ring seals may be formed by one or a plurality of edges, sharp, blunt or of various designs, under one or typically both pole pieces of the ferrofluid seal, or by edges formed in the opposing surface of the rotary shaft. The magnetic flux under each edge magnetically retains the ferrofluid, to form a plurality of O-ring seals and a multiple-stage seal, wherein a plurality of ferrofluid O-rings separated by air between each individual O-ring seal is formed, with the number of ferrofluid O-rings depending upon the desired pressure capacity of the seal.

It has been discovered that a single-pole piece seal may be designed which reduces or eliminates air bursts entering the system. The seal apparatus of the invention is designed to permit a multiple-stage, pressure-capacity-type seal toward the high-pressure environment and to permit a very shallow radial gap or leak to occur between the end of the pole piece and the surface of the shaft which extends toward the low-pressure environment, so that entrapped air in the seal apparatus is predictably and gradually moved into the low-pressure or vacuum environment; thus avoiding unpredictable air bursts which might occur later in the operation after installation of the pressure-capacity-type ferrofluid seal. The ferrofluid seal of the invention provides for a very shallow-depth radial gap under the pole piece toward the low-pressure environment and extends the end of the pole piece into a close, even contacting relationship with the surface of the shaft if desired, and provided that the particles of the shaft or the pole pieces will not contaminate the sealed atmosphere, and avoids the use of ferrofluid in the radial gap on the vacuum side of the environmment, so as to permit entrapped air to be removed quickly from the low-pressure environment at the time of pump down.

In one embodiment of a seal design of the invention, a nonmagnetic permeable material, such as nonmagnetic metal, but more particularly a plastic or polymeric material, such as a thermosetting resin like epoxy, is employed between the surface of the shaft and the one end of the pole piece on the low-pressure environment, to reduce the radial gap and provide for a virtually slow air leak, and wherein, if desired, the other end of the pole piece even may contact the nonpermeable material, or have a gap significantly smaller than the radial gap in the other pole piece, such as, for example, typically under 2 mils and more typically less than one mil. In another seal apparatus design, the ferrofluid seal apparatus provides for a multiple-stage seal under the pole piece on the high-pressure environment; however, the multiple stages have a depth of stages which is much shallower than normal and are filled with ferrofluid, such as, for example, having multiple stages wherein the stage depth is quite shallow; for example, 2 mils or less. In this design, the radial gap under both the high- and low-pressure-side pole pieces is maintained quite low, and typically, for example, 2 mils or less; however, the high-pressure-side pole piece retains the ferrofluid in the shallow depth, and no ferrofluid is employed under the low-pressure-side pole piece. Such ferrofluid seal apparatus shows no bursting in operation and provides for a predictable and reliable sealed environmental system.

The invention will be described for the purpose of illustration only in connection with certain embodiments; however, it is recognized that some changes and modifications may be made by those persons skilled in the art, all falling within the spirit and scope of the invention.

DESCRIPTION OF THE EMBODIMENTS

Figure 1:
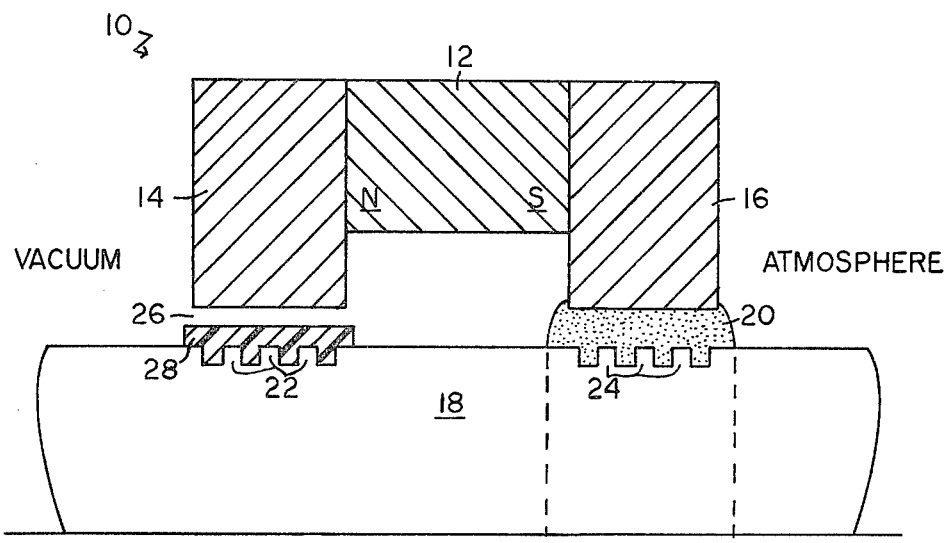
FIG. 1 is a partial, sectional, illustrative, schematic view of a ferrofluid seal of the invention.

FIG. 1 shows a ferrofluid seal 10 of the invention having an annular permanent magnet 12, with annular pole pieces 14 and 16 surrounding a magnetically permeable shaft 18. A plurality of edges 22 and 24 are formed on the surface of the shaft beneath the respective pole pieces 16 and 14; however, such edges also may be formed at the other ends of the pole pieces. A low-vapor-pressure, high-viscosity, high-magnetization ferrofluid 20 is retained under the end of the pole piece 16 and is concentrated about the edges 24, to form a plurality of separate O-ring-type ferrofluid seals on the pressure side of the seal. The plurality of edges 22 beneath the other end of pole piece 14 is filled in with a nonmagnetic permeable material, such as a thermosetting epoxy resin 28, with the surface of the epoxy resin and the end of the pole piece 14 forming a very small radial gap therebetween, with no ferrofluid therein. This seal design, as illustrated, provides for a plurality of ferrofluid O-ring seals on the atmospheric side and provides a virtual leak on the vacuum side, thereby venting air from the interstage volumes of the seal apparatus 10 gradually into the vacuum environment over a long time period in low amounts.

In the ferrofluid seal design apparatus illustrated in FIG. 1, a standard shaft 18 is employed with a plurality of edges to form stages in both the atmospheric and vacuum sides ($0.030 \times 0.025 \times 0.010$ inches). The vacuum-side stages or edges 22 were filled with an epoxy, nonmagnetic resin, to reduce the air gap in the radial gap 26, to form a usual standard value of about 2 mils to 1 mil or less. Alternatively, of course, it is recognized that the shaft 18 may be employed with no edges or stages under the vacuum-side pole piece 14, and the radial-gap clearance made between the flat surface of the shaft and the other end of the pole pieces made as small as possible; for example, less than 1 mil, and even approaching and touching is permissible. The ferrofluid 20 was used only under the atmospheric-side pole piece 16, with an air gap of about 2 mils, and provided the required pressure capacity for the seal apparatus 10, with no ferrofluid being used under the vacuum-side pole piece 14. The tight clearance, along with the long channel underneath the pole piece 14 on the atmospheric side, provided essentially a virtual leak, venting air from the interstage volume gradually into the vacuum side at the initial pump down, rather than an enlarged burst.

Figure 2:
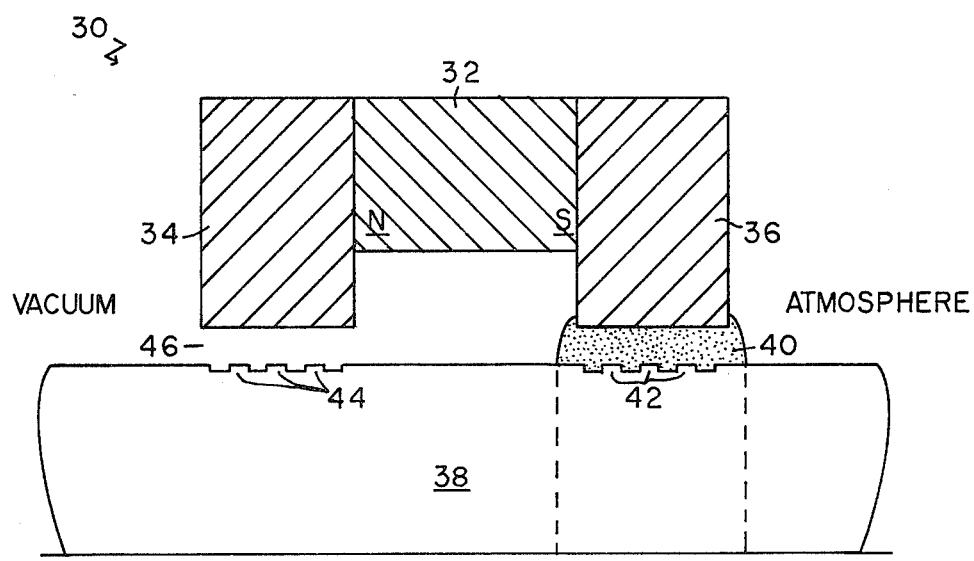
FIG. 2 is a partial, schematic, illustrative view of another ferrofluid seal of the invention.

FIG. 2 shows another embodiment of the seal apparatus 30 of the invention employing a shallow-stage design, wherein the seal 30 has an annular permanent magnet 32 and pole pieces 34 and 36 surrrounding a magnetically permeable shaft 38 extending between a pressure and vacuum environment. Ferrofluid 40 is employed under the pole piece 36, which provides a plurality of ridges 42 on the surface of the shaft defining a plurality of separate ferrofluid O-ring stages in the sealing operation, while edges 44 are underneath the pole piece 34, to define a very small radial gap 46. No ferrofluid 40 is placed under pole piece 34. In this design, the multiple-stages formed under the pole piece 36 are quite shallow in depth; for example, less than 2 mils.

In a single-stage ferrofluid-type vacuum seal, this seal in principle should be nonbursting, since there are no air pockets which would result from interstage regions present in the standard multiple-stage seal configurations. However, a single-stage vacuum ferrofluid seal must have a pressure capacity in excess of 14.7 psi, plus additional reserve pressure capacity, which, with the existing technology, is not generally achievable with enough reliability. However, in the design of the seal apparatus of FIG. 2, a multiple-stage configuration is provided in which the stages have a very shallow depth or small depth and are filled with ferrofluid. Thus, this seal design comes very close to obtaining a single-stage vacuum seal with a pressure capacity that has enough safety margin for vacuum-type applications. A stage configuration of, for example, $0.020 \times 0.020 \times 0.002$ inches is used in one of the shafts in this design, so it is noted that the stage depth is only 2 mils. The radial gap or air gap under both of the vacuum- and atmospheric-side pole pieces is maintained to a low value, such as 2 mils or less. Only the atmospheric-side pole piece is charged with ferrofluid, and no ferrofluid is employed under the vacuum-side pole piece. An excess quantity of ferrofluid is employed, to ensure that all of the interstage volumes are filled with ferrofluid and no air pockets are allowed which might contribute to air bursting.

FIGS. 1 and 2 then show two embodiments of the ferrofluid seal apparatus of the invention, both directed to a single pole piece, pressure-capacity-type seal of a virtual-leak and shallow-stage design, both permitting the entrapped air in the seal apparatus to be moved gradually and predictably to the vacuum side; thus avoiding air bursts.

What we claim is:

1. A single pole, ferrofluid magnetic seal apparatus adapted to provide a ferrofluid pressure-type seal about a shaft extending between a first low-pressure and a second high-pressure environment, which seal apparatus comprises:
    (a) an annular permanent magnet having poles of opposite polarity and adapted to surround the shaft to be sealed;
    (b) first and second magnetically permeable pole pieces, each having a one and another end, the one end of each pole piece in a magnetic-flux relationship with the opposite poles of the permanent magnet, the other end of each pole piece adapted to extend into a close, noncontacting relationship with the surface of the shaft to be sealed, to define a radial gap at the end of each pole piece, the other end of the second pole piece forming, with the surface of the shaft to be sealed, a plurality of separate stages in the radial gap under the second pole piece;
    (c) a ferrofluid retained in the radial gap under the second pole piece between the separate stages, the ferrofluid adapted to provide a plurality of separate O-ring ferrofluid seals about the surface of the shaft to be sealed in operation, and the radial gap under the other end of the first pole piece essentially free of ferrofluid; and
    (d) the second pole piece adapted to be placed toward the high-pressure environment and the first pole piece adapted to be placed toward the low-pressure environment, and having a radial gap substantially less than the radial gap under the second pole piece,
    thereby providing a single pole, ferrofluid, pressure-type seal apparatus having a reduced tendency to permit air bursts, when installed about the shaft and between the first low- and the second high-pressure environments.

2. The apparatus of claim 1 wherein the ferrofluid in the radial gap beneath the other end of the second pole piece comprises a low-vapor-pressure ferrofluid having a viscosity of greater than about 1000 cps and a magnetization greater than about 600 gauss.

3. The apparatus of claim 1 wherein the radial gap under the first pole piece is less than about 2 mils.

4. The apparatus of claim 1 which includes a nonmagnetic permeable material placed at the other end of the first pole piece, to reduce the radial gap under the other end of the first pole piece.

5. The apparatus of claim 1 wherein the other end of the first pole piece forms, with the surface of the shaft to be sealed, a plurality of separate stages.

6. The apparatus of claim 5 which includes a nonmagnetic, permeable material placed between the individual stages under the first pole piece, to provide a flat surface between the surface of the shaft and the other end of the first pole piece.

7. The apparatus of claim 1 which includes a rotary shaft extending between a first atmospheric-pressure environment and a second vacuum-pressure environment, the rotary shaft sealed by a plurality of separate O-ring stages under the second pole piece of the seal apparatus of claim 1.

8. The apparatus of claim 1 wherein the radial gap under the second pole piece ranges from about 2 to 5 mils, and the radial gap under the first pole piece is less than about 1 mil.

9. A seal system which comprises:
    (a) a first environment at a one pressure and a second environment at a different pressure;
    (b) a rotary-shaft element extending between the first and second environments, which shaft element is to be sealed; and
    (c) a ferrofluid seal apparatus of claim 1 about the rotary-shaft element, to form a pressure-type, ferrofluid seal between the first and second pressure environments by a plurality of separate O-ring seals under the other end of the second pole piece.

10. In a ferrofluid magnetic sealing method, which method comprises forming a single pole, ferrofluid magnetic seal about a rotary shaft, which rotary shaft extends between a first low- and a second high-pressure environment, the improvement which comprises:
(a) forming a plurality of separate ferrofluid O-ring seals between the end of one pole piece and the surface of the rotary shaft, which pole piece extends toward the high-pressure side of the environment to be sealed; and
(b) extending the other end of another pole piece toward the surface of the shaft to be sealed, to form a defined radial gap between the other end of the pole piece and the surface of the shaft, the radial gap under the pole piece essentially free of any ferrofluid and extending into a close, noncontacting relationship with the surface of the shaft to be sealed and significantly less than the radial gap under the pole piece which forms a plurality of O-ring seals.

11. The method of claim 10 wherein the ferrofluid employed, to form the plurality of ferrofluid O-ring seals, comprises a low-vapor-pressure ferrofluid having a viscosity of about 1000 cps or greater and a magnetization of about 600 gauss or greater.

12. The method of claim 10 wherein the radial gap beneath the pole piece on the low-pressure side of the environment is about 2 mils or less.

13. The method of claim 10 wherein the high-pressure environment is the atmospheric pressure and the low-pressure environment is a vacuum environment.

14. The method of claim 10 which includes placing a nonmagnetic permeable material in the radial gap under the pole piece toward the low-pressure environment side.

* * * * *